April 21, 1953 W. A. BRYANT 2,635,787
COLLAPSIBLE REFILL CARTRIDGE FOR GREASE GUNS
Filed May 24, 1948
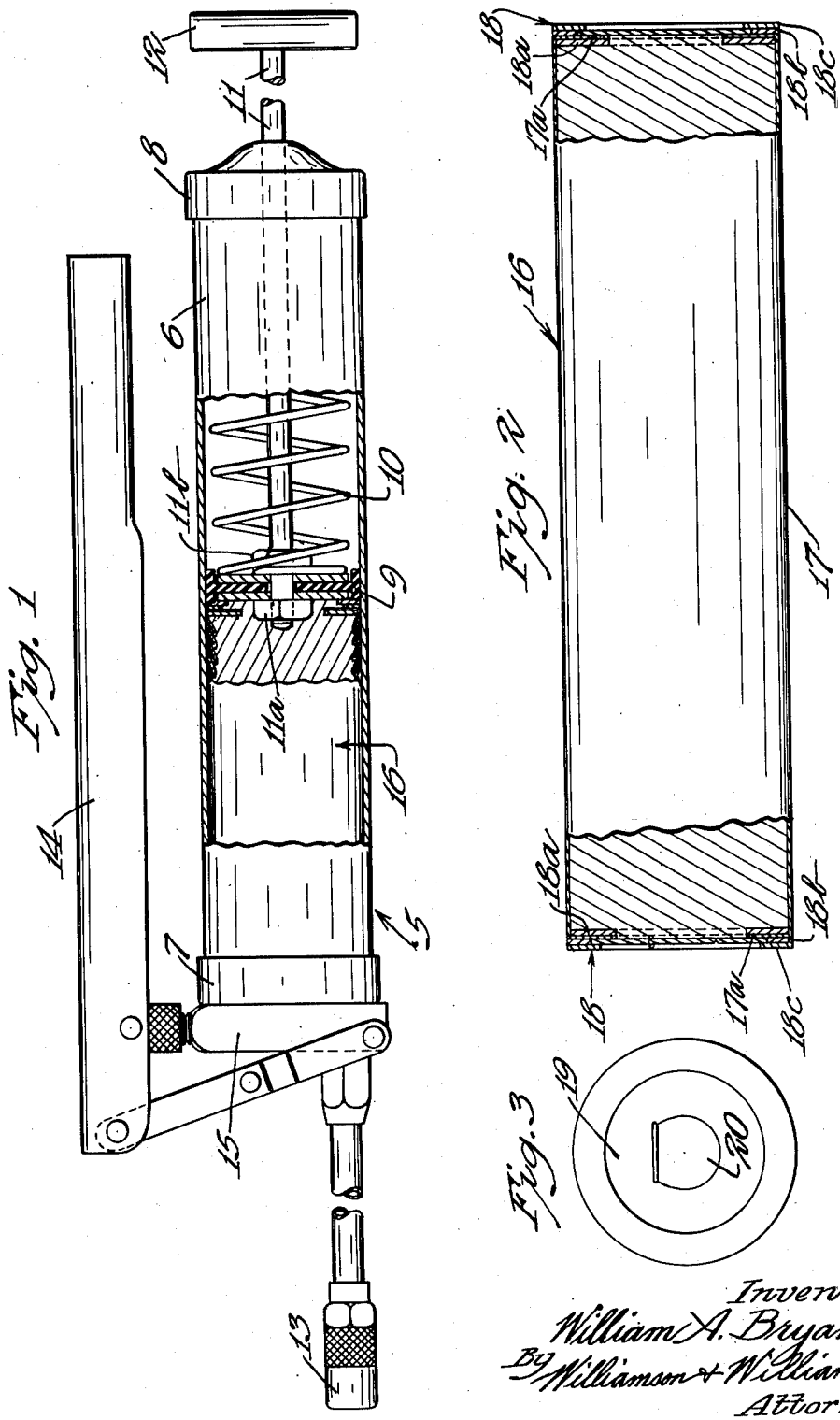
Inventor
William A. Bryant
By Williamson & Williamson
Attorneys Patented Apr. 21, 1953

2,635,787

UNITED STATES PATENT OFFICE 2,635,787

COLLAPSIBLE REFILL CARTRIDGE FOR GREASE GUNS

William A. Bryant, Minneapolis, Minn., assignor to Capsulube Company, Minneapolis, Minn., a partnership Application May 24, 1948, Serial No. 28,823

2 Claims. (Cl. 222—95)

This invention relates to grease cartridges for conventional grease guns.

The filling of grease guns has long been a difficult and dirty job. A few cartridges have been designed but these have necessitated a special grease gun and, in addition, have increased the cost of the grease to a point where it was not economically practical for the consumer to purchase grease in this form.

It is an object of my invention to provide a novel and highly efficient very inexpensive compressible cartridge for conventional grease guns and adapted to be compressed within the reservoir of the gun as the grease is discharged from said cartridge.

It is another object to provide a compressible cartridge adapted to be received by the reservoir of a grease gun to provide grease therefor and having a removable end closure element at at least one end thereof to permit at least one of the normally closed ends to be opened to permit grease to be discharged therefrom.

It is still another object to provide a cartridge having removable closure elements at both ends thereof to facilitate filling thereof and to permit said cartridge to operate efficiently in substantially all conventional grease guns without any change in the grease gun whatsoever.

These and other objects and advantages of my invention will more fully appear from the following description made in connection with the accompanying drawings wherein like reference characters refer to the same or similar parts throughout the several views and in which;

Fig. 1 is a side elevational view of a conventional grease gun with a portion of the reservoir cylinder cut away to show one of my cartridges in partially compressed position therein;

Fig. 2 is a side elevational view of a grease cartridge embodying my invention and having the end portions thereof cut away to show the closure elements in sections; and, Fig. 3 is an end elevational view of the cartridges shown in Fig. 2.

A conventional grease gun 5 having the reservoir cylinder 6 with front and rear end caps 7 and 8 respectively threaded thereon is illustrated in Fig. 1. The cylinder has a spring pressed grease ejecting piston 9 slidably mounted in sealed relation resiliently urged forwardly by a spring 10 seated against the rear surface thereof and having its rear end seated in the rear cap 8. A spring retraction rod 11 with a gripping handle 12 fixed at the rear end thereof, has its forward end securely fixed to the piston 9 as by the nuts 11a and 11b to permit retraction thereof to permit the reservoir 6 to be loaded. Suitable conventional means are provided for ejecting grease under high pressure from an outlet in the fitting 13 such as the operating lever 14 for actuating a high pressure grease supply system which communicates with the reservoir 6 and said outlet.

As best shown in Fig. 2, I provide a cartridge 16 which in the form shown has a substantially cylindrical casing 17 and end closure elements 18. The casing 17 is made from any highly flexible and pliable material on which grease will not have a deleterious effect. A pair of annular sealing rings 18a are connected respectively at the ends of said casing 17 and the end portions 17a of said casing 17 are respectively overlapped upon said rings 18a in sealed relation thereto and are securely fixed to said rings 18a as by being glued thereto. A pair of annular spacing rings 18b are respectively secured to each of the overlapped end portions 17a of casing 17 and the diameter of the inner aperture formed in each of the spacing rings 18b is slightly greater than the diameter of the inner aperture formed in each of the sealing rings 18a. A retaining ring 18c is securely fixed to each of the spacing rings 18b to overlie the same and the diameter of the inner aperture formed in each of the annular rings 18c is slightly less than the diameter of the respective spacing rings 18b but slightly greater than the diameter of the aperture in each of the sealing rings 18a. Thus, it will be seen that cap receiving grooves are respectively formed between outer retaining rings 18c and the inner sealing rings 18a. The closure cap 19 may take the form of a carboard disc as best shown in Fig. 3, and is adapted to be sealingly received in the respective grooves and retained therein by retaining rings 18c. The diameter of the cap 19 is slightly greater than the central aperture formed in each of the retaining rings 18c. A suitable gripping element such as the flap 20 is provided on the outside of each cap 19 to permit said cap to be removed and pulled through the central aperture of its retaining ring 18c.

The laminated construction of the annular rings 18a, 18b and 18c at the ends of the casing 17 form a substantially rigid reinforcement for the casing at both ends thereof as well as forming a highly efficient groove or socket into which the cap 19 can be removably inserted to be normally retained therein. Conventional grease guns have two types of reservoir pistons. One of these types has a substantially flat smooth forward surface and is adapted to engage and abut a flat disc such as the closed end of my cartridge. The other type of piston is illustrated in Fig. 1 of the drawings and has a forwardly extending projection such as the retaining nut 11a which would cause a closed disc at the rear end of the cartridge to tilt and prevent the casing from compressing uniformly as it should do for most efficient operation. This problem is solved by providing the removable closure cap at both ends.

These cartridges with both ends open are relatively simple to fill with grease or other petroleum products and thereafter the ends closed by insertion of the caps 19 into the respective grooves at the front and rear ends of said cartridge. The cartridge may thereafter be easily packed in suitable cartons for distribution and sale. When the cartridge is to be inserted into the reservoir of a grease gun, the reservoir cylinder 6 is initially removed from the front cap 7 and the piston 9 retracted against the resilient force of spring 10 to permit the grease cartridge to be inserted into the reservoir 6. The forward end of the cartridge is opened by removing the cap 19 therefrom and if the gun is one of the type having an outstanding projection on the forward face of the plunger or piston 9, the cap 19 at the rear of the cartridge is also removed as previously described and the cartridge is inserted into the reservoir cylinder 6 and the reservoir cylinder 6 replaced on the grease gun by inserting the same in the front cap 7. If the piston has a flat smooth forward surface the rear closure cap 19 is merely left in place to abut the forward surface of the piston. The spring pressed piston 9 forces the grease out through the forward end of the cartridge and reservoir cylinder 6 in the usual manner and as the grease is discharged from the cartridge, the rear portion thereof is compressed into folds substantially similar to accordion pleats.

Obviously, the casing can be made from any thin sheet of highly flexible and pliable material on which grease and petroleum products will not have a deleterious effect. It has been found that cellophane is such a material and is ideally suited for this use because it is so highly pliable and forms a cartridge which is completely collapsible when the grease is discharged therefrom.

The highly flexible and pliable material from which the casing is constructed is relatively flimsy and unstable until filled with some lubricating material at which time, the sides due to the pressure of the lubricant thereon, are stably expanded and combine with the lubricant to form a relatively stable filled unit. This is particularly true when the casing is filled with higher viscosity lubricants such as grease. The annular ring at the rear end of said casing abuts the outer peripheral portion of said piston 9 and provides a pressure plate which uniformly compresses the casing as grease is discharged therefrom.

It will be seen that I have provided an extremely simple and inexpensive collapsible cartridge which will not materially increase the cost of the product so packaged and yet on the other hand, will provide a neat, highly efficient means for easily refilling substantially any of the conventional grease guns now on the market without making any change whatsoever in any part of said guns. The completely compressed cartridges from which all of the grease has been discharged are disposable and are easily removed from the reservoir and a new cartridge inserted therein as previously described.

It will of course, be understood, that various changes may be made in the form, details, arrangement and proportions of the parts without departing from the scope of my invention.

What I claim is:

1. A grease cartridge for conventional grease guns comprising a compressible, substantially cylindrical casing, constructed of highly pliable, relatively thin material and adapted to be filled with lubricant material, a pair of substantially flat annular ring structures respectively fixed at the front and rear ends of said casing to peripherally reinforce said casing ends and shaped to form cap-receiving sockets around the inner periphery thereof, a pair of removable caps respectively inserted in said sockets and normally retained therein, but being adapted to be removed therefrom to provide openings at both ends of said casing, the annular ring structure at the rear of said casing being adapted to abut the piston of a grease gun to uniformly compress the casing as lubricant is discharged from the reinforced forward end of said casing.

2. A grease cartridge for conventional grease guns comprising the combination of a compressible, substantially cylindrical casing, constructed of highly pliable, relatively thin material and adapted to be filled with lubricant material, a pair of laminated annular ring structures having the ends at the front and rear of said casing securely sealed between a pair of adjacent laminations of said rings to peripherally reinforce the ends of said casing and having cap receiving sockets formed around the inner peripheries thereof, a pair of removable caps respectively inserted in said sockets and normally retained therein, but being adapted to be removed therefrom to provide openings at both ends of said casing, the annular ring structure at the rear of said casing being adapted to be abutted by the piston of a grease gun to uniformly compress the casing as lubricant is discharged from the reinforced forward ends of the casing.

WILLIAM A. BRYANT.

References Cited in the file of this patent

UNITED STATES PATENTS

| Number | Name | Date |
|---|---|---|
| 2,031,671 | Rising | Feb. 25, 1936 |
| 2,075,131 | Parkinson | Mar. 30, 1937 |
| 2,096,397 | Harris | Oct. 19, 1937 |
| 2,131,487 | Tear | Sept. 27, 1938 |